United States Patent Office 3,190,910
Patented June 22, 1965

---

3,190,910
PROCESS FOR THE PRODUCTION OF THREO-1-p-NITROPHENYL - 2 - DICHLOROACETAMIDO-3-AMINOACETOXYPROPAN-1-OL AND ITS SALTS
Ernest D. Nicolaides, Grosse Pointe Farms, Mich., assignor to Parke, Davis & Company, Detroit, Mich., a corporation of Michigan
No Drawing. Filed June 26, 1958, Ser. No. 744,655
5 Claims. (Cl. 260—482)

The present invention relates to amino acid esters of threo-1-p-nitrophenyl - 2 - dichloroacetamidopropane-1,3-diols, to acid-addition salts thereof, and to methods for producing the same.

In the forms of their free bases, compounds of this invention can be represented by the structural formula

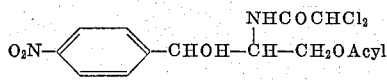

wherein the acyl radical is the acyl radical of an amino acid. The amino acid can be selected from among amino carboxylic acids and amino sulfonic acids. It can be selected from among aliphatic amino acids such as glycine, alanine, β-alanine, β-aminoethanesulfonic acid, valine, leucine, norleucine, isoleucine, serine, threonine, methionine, and lysine; alicyclic amino acids such as amino derivatives of cyclohexaneacetic acid; aromatic amino acids such as phenylalanine, tyrosine, anthranilic acid and p-aminobenzoic acid; and heterocyclic amino acids such as histidine and tryptophane. In those instances where optical activity is possible, the acids can be of the so-called natural configuration or L-series, the so-called unnatural configuration or D-series, or the racemates. The natural or L-series is usually preferred.

It will be apparent to those skilled in the art that the 1-p-nitrophenyl-2-dichloroacetamidopropane-1,3-diols used as starting materials in the practice of this invention, as well as the esters of the foregoing structural formula obtained as products therefrom, can exist in various isomeric forms. These include diastereo-isomeric forms as well as optically isomeric forms. The present invention is concerned with compounds having the threo diastereo-isomeric form as distinguished from the erythro diastereo-isomeric form. The groups on the two asymmetric carbon atoms of the threo forms have the same relative spatial configuration or arrangement as the groups on the two asymmetric carbon atoms of pseudo ephedrine and threose. As used herein the term "threo" without an accompanying designation of optical form is defined to include DL-threo, corresponding to racemic or DL-threose, and D-threo, corresponding to D-threose. Where a particular optical form is intended, a notation will be used with the term "threo" such as D-threo.

Because of the difficulty of representing these spatial distinctions in two dimensional formulas, the customary structural formulas are used throughout the disclosure along with a notation, where appropriate, to designate the stereochemical form.

The preferred embodiments of this invention are those amino acid esters of threo-1-p-nitrophenyl-2-dichloroacetamidopropane-1,3-doils in which the acyl radical of the ester group is the acyl radical of a lower aliphatic amino carboxylic acid. Such compounds, in the forms of their free bases, can be represented by the structural formula

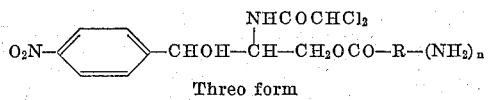

Threo form wherein A represents an aliphatic residue having fewer than 9 carbon atoms and n is 1 or 2. In these preferred embodiments, the acyl radical of the ester group can be a monoamino acid acyl radical such as a glycyl, alanyl, β-alanyl, valyl, leucyl, norleucyl, isoleucyl, seryl, or methionyl radical; or a diamino acid acyl radical such as the lysyl radical.

Of these preferred embodiments, the compounds which are the most suitable, by reason of their advantageous solubility properties, the availability of starting materials for their manufacture, or other factors, are the α-amino acid esters which can be represented, in the form of their free bases, by the structural formula

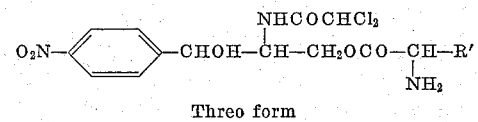

Threo form wherein R' is an aliphatic residue having fewer than 8 carbon atoms. Among this group of compounds are those esters of α-amino aliphatic hydrocarbon carboxylic acids which can be represented, as free bases, by the structural formula

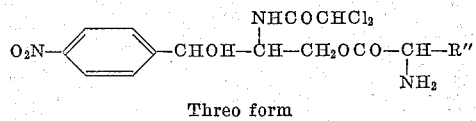

Threo form wherein R" represents hydrogen or a lower alkyl radical containing fewer than 8 carbon atoms.

Compounds of this invention can be produced by removal of the trityl group or groups from a trityl derivative of the formula

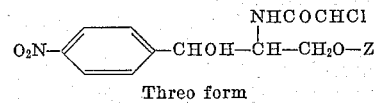

Threo form wherein Z is an acyl radical containing 1 or more tritylamino groups. In the preferred embodiments of the invention, such trityl derivatives are those having the formula

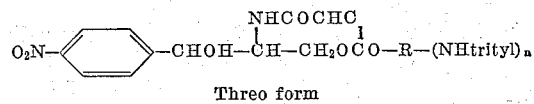

Threo form wherein R represents an aliphatic residue having fewer than 9 carbon atoms and n is 1 or 2. The trityl radical is the triphenylmethyl radical

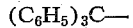

In the majority of cases, only a single trityl group is present to be removed, with the production of an amino ester having a single amino group, but in the formation of compounds such as the lysine ester, which can afford a ditrityl derivative, all of the trityl groups which are present are removed.

The removal of the trityl group or groups is accomplished by dissolving the trityl derivative in a suitable solvent and treating with an acid. It is satisfactory to employ a neutral or unreactive solvent such as acetone or a lower alkanol and treat the solution with an inorganic acid such as hydrochloric acid, dilute sulfuric acid, hydrobromic acid or other mineral acid. An anhydrous reagent such as hydrogen chloride in absolute ethanol, chloroform or ether can be employed. It is also satisfactory to use organic acids such as lower alkanoic acids or alkanesulfonic acids in the removal of the trityl group; and by the use of an acidic solvent such as dilute acetic acid, the reaction proceeds without the addition of another acid.

Only a catalytic amount of the free acid is necessary for the removal of the trityl group. Since one equivalent of the acid is consumed in the formation of the salt of the trityl derivative, it is satisfactory to use only a slight excess over this quantity to carry out the reaction. The removal of the trityl group proceeds satisfactorily over a wide range of temperatures and reaction times. Particularly when mineral acids are used, the reaction is complete within 10–15 minutes at room temperatures and it is unnecessary to heat the mixture or carry out the reaction for a longer period. When using weaker acids such as acetic acid, the reaction is completed more readily by moderate heating, or by heating at the reflux temperature for a few minutes, but, in any case, prolonged heating at a temperature over 50° C. is to be avoided because of the possibility for hydrolysis of the amide group. Upon the completion of the reaction, the desired amino ester can be isolated directly as its acid-addition salt or, after neutralization, as the free base.

The threo-1-p-nitrophenyl-2-dichloroacetamido-3-tritylaminoacyloxypropan-1-ols required as starting materials for this process can be prepared by treating N-trityl amino acids with a sulfonyl halide such as p-toluenesulfonyl chloride or benzenesulfonyl chloride in the presence of a tertiary base such as pyridine or triethylamine to obtain the desired acylating agent, followed by reacting this acylating agent with a threo-1-p-nitrophenyl-2-dichloroacetamidopropane-1,3-diol. It is satisfactory to conduct this acylation reaction in a solvent such as acetone or pyridine at 0–15° C. for 15 minutes to an hour and then to isolate the product by dilution with water. While it is believed that the effective acylating agent consists primarily of the N-trityl amino acid anhydride, it will be understood that a mixed anhydride can also be present and function as an acylating agent. The precise characterization of the acylating agent at the moment of reaction is, of course, unnecessary for the successful practice of this invention.

The free bases of this invention form non-toxic, water-soluble, acid-addition salts with a number of inorganic and strong organic acids. Among such acids are hydrochloric, hydrobromic, hydriodic, sulfuric, acetic, citric, maleic, malic, glyconic, ascorbic and related acids. Such acid-addition salts, prepared by admixture of the free base and the acid, are equivalent for purposes of this invention to the free bases and in particular to the free bases dissolved in acidic medium.

The free bases can be obtained from corresponding acid-addition salts by dissolving the acid-addition salts in a suitable solvent such as water and carefully adding a base such as sodium hydroxide or preferably sodium bicarbonate to the point of precipitation of the free base or neutralization.

The compounds of this invention are valuable in affording water-soluble forms of chloramphenicol [D-(−)-threo - 1 - p - nitrophenyl-2-dichloroacetamidopropane-1,3-diol] and its optical racemate for administration. They can be constituted into aqueous solutions which have desirable properties for parenteral injection. For this purpose, the non-toxic, acid-addition salts are dissolved directly in water or in water containing a buffer; or the free bases are dissolved in an acidified aqueous medium. A particular advantage of the resulting preparations is that they are rapidly hydrolyzed to chloramphenicol or its optical racemate in the body.

The invention is illustrated, but not limited by the following examples:

*Example 1*

To a solution of 5 g. of N-tritylglycine in 100 ml. of pyridine at 25° C. is added 6 g. of p-toluenesulfonyl chloride. The solution is cooled to about 5° C., following which a solution of 5 g. of D-(−)-threo-1-p-nitrophenyl-2-dichloroacetamidopropane-1,3-diol (chloramphenicol) in 20 ml. of pyridine is added. The reaction mixture is maintained at about 5° C. for one hour and is then poured into 1 liter of ice water. The crude, precipitated product is separated and dissolved in ethyl acetate. This solution is dried and evaporated. The oily residue, which is crude D - threo - 1 - p - nitrophenyl-2-dichloroacetamido-3-(N-tritylaminoacetoxy)-propan-1-ol, is dissolved in 50 ml. of acetone. Concentrated hydrochloric acid (1.6 ml.) is added, and after 10 minutes the solution is diluted with several times its volume of ether. The precipitated product is collected and recrystallized from a mixture of acetone and ethylene dichloride. It is D-threo-1-p-nitrophenyl - 2-dichloroacetamido-3-aminoacetoxypropan-1-ol hydrochloride (D - threo-1-p-nitrophenyl-2-dichloroacetamido-3-glycyloxypropan-1-ol hydrochloride; chloramphenicol glycinate hydrochloride; chloramphenicol aminoacetate hydrochloride) which melts at about 172–174° C.

The free base, chloramphenicol glycinate, is prepared by slowly treating a cold, aqueous solution of the hydrochloride with sodium bicarbonate and collecting the precipitated product. This compound has the structural formula

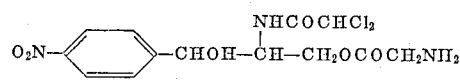

D-threo form

A solution of the free base in ether containing a small quantity of isopropyl alcohol is treated with 1 equivalent of hydrogen bromide in isopropyl alcohol. After dilution with a further quantity of ether, the insoluble hydrobromide is collected.

A water-soluble citrate is obtained by mixing methanolic solutions of the free base and citric acid and concentrating to a small volume.

*Example 2*

A solution of 2.46 g. of N-trityl-DL-methionine in 50 ml. of pyridine is treated with 2.4 g. of p-toluenesulfonyl chloride at room temperature and then cooled to about 5° C. A solution of 2 g. of DL-threo-1-p-nitrophenyl-2-dichloroacetamidopropane-1,3,-diol in 10 ml. of pyridine is added and the reaction mixture is maintained at about 5° C. for an additional hour. It is then poured into 500 ml. of ice water. The precipitated product is separated and dissolved in ethyl acetate. The ethyl acetate solution is washed with water, dried and evaporated. The crude trityl derivative obtained as a residue upon evaporation is dissolved in 40 ml. of ethanol. Hydrogen chloride (0.3 g.) is added and the solution is maintained at room temperature for 20 minutes and then diluted with several times its volume of ether. The precipitated hydrochloride is collected, washed with ether and dissolved in cold water. The aqueous solution is treated with sodium bicarbonate until separation of the insoluble free base is complete. This product is then collected and washed with water. It is DL-threo-1-p-nitrophenyl-2-dichloroacetamidopropane-1,3-diol DL-2-amino-4-methylthiobutyrate of the structural formula

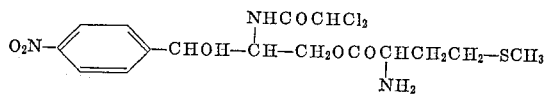

DL-threo form

This free base dissolves readily in dilute sulfuric acid as a sulfate salt.

*Example 3*

A solution of 5.2 g. of N-trityl-DL-alanine in 100 ml. of pyridine at 20–25° C. is treated with 6 g. of p-toluenesulfonyl chloride. The solution is cooled to about 5° C. and treated with 5 g. of chloroamphenicol dissolved in 20 ml. of pyridine. This mixture is maintained at about 5° C. for one hour and then poured into several times its volume of ice water. The precipitated product is separated, washed with water, and dissolved in ethyl acetate. This solution is rendered anhydrous and brought to dryness by evaporation of the solvent. A solution of the residual N-trityl derivative in 50 ml. of acetone is treated with 1.6 ml. of concentrated hydrochloric acid and allowed to stand for 10 minutes. The reaction mixture, is diluted with a large volume of ether and the precipitated product is collected. If further purification is desired, it can be recrystallized from a mixture of acetone and ethylene dichloride. This compound is chloramphenicol DL-2-aminopropionate hydrochloride which, in a potassium bromide disc, exhibits prominent infrared absorption maxima at about 3.0, 3.3, 5.7, 5.9, 6.2, 6.6, 7.4, 8.1 and 12.2 microns. The free base, obtained by careful neutralization of an aqueous solution of the hydrochloride with potassium bicarbonate, has the structural formula

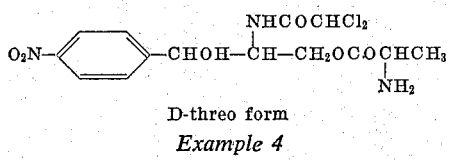

D-threo form

*Example 4*

N-trityl-β-alanine is prepared by the reaction of ethyl 3-aminopropionate hydrochloride in chloroform with triethylamine and trityl chloride followed by hydrolysis of the ester, according to the general procedure given by Amiard et al., "Bull. Soc. Chim.," pg. 191 (1955). By the substitution of 5.2 g. of N1trityl-β-alanine for the N-trityl-DL-alanine in the procedure of Example 3, there is obtained chloramphenicol DL-3-aminopropionate of the structural formula

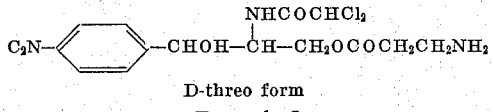

D-threo form

*Example 5*

To a solution of 5.9 g. of N-trityl-L-leucine in 100 ml. of pyridine at 25° C. is added 6 g. of p-toluenesulfonyl chloride. The solution is then chilled to about 0.65° C. A solution of 5 g. of chloramphenicol in 20 ml. of pyridine is slowly added and after the addition is complete the reaction mixture is maintained at about 5° C. for an additional hour. The crude product, which is precipitated by dilution with a large volume of ice water, is collected and dissolved in ethyl acetate. The ethyl acetate solution is dried and evaporated and the oily residue containing the N-trityl derivative of the desired amino ester is dissolved in 85 ml. of acetone. Concentrated hydrobromic acid (2 ml.) is added and after 15 minutes the solution is diluted with several times its volume of ether. The precipitated product is collected and washed with ether. If further purification is desired, the product is recrystallized from a mixture of acetone and ethylene dichloride. This compound is chloramphenicol L-2-amino-4-methylvalerate hydrobromide. In a potassium bromide disc, infrared absorption maxima are observed at about 3.0, 3.3, 5.7, 5.9, 6.2, 6.6, 7.4, 8.1 and 12.2 microns. The free base is obtained by neutralizing an aqueous solution of the hydrobromide with sodium bicarbonate, extracting with chloroform and evaporating the chloroform extract.

What is claimed is:

1. Process for the production of a compound of the class consisting of threo-1-p-nitrophenyl-2-dichloroacetamido-3-aminoacetoxypropan-1-ol and water-soluble, pharmaceutically-acceptable acid-addition salts thereof which comprises reacting threo-1-p-nitrophenyl-2-dichloroacetamido-3-(N-tritylaminoacetoxy)-propan-1-ol with an acid, and isolating the product.

2. Process according to claim 1 wherein the product is isolated directly as an acid-addition salt.

3. Process according to claim 1 wherein, following reaction with the acid, the reaction mixture is neutralized and the product is isolated as the free base.

4. Process according to claim 1 wherein the acid is mineral acid and the process is carried out at room temperature.

5. Process according to claim 1 wherein the threo form is D-threo.

References Cited by the Examiner

Noller: Chemistry of Organic Compounds, Sec. Ed., p. 526 (1957).

Theilheimer: Synthetic Methods of Organic Chemistry, vol. II, page 85, Nos. 248–250 (1949), Interscience Publishers, Inc., New York.

Zervas et al.: JACS, vol. 78 (1956), pp. 1359–63.

Stacey et al.: Journal Chem. Society (London), pp. 587–588, 1944.

Affidavit of Dr. Harry M. Crooks, Jr., March 1, 1963.

IRVING MARCUS, *Primary Examiner.*

H. J. LIDOFF, WALTER A. MODANCE, *Examiners.*